Patented Feb. 2, 1954

2,668,147

UNITED STATES PATENT OFFICE 2,668,147

PROCESS FOR PRODUCING A MATERIAL CONTAINING SODIUM POLYPHOSPHATES

Bruno Blaser, Dusseldorf-Holthausen, and Friedrich Weldes, Dusseldorf-Benrath, Germany, assignors to Henkel & Cie G. m. b. H., Dusseldorf-Holthausen, Germany No Drawing. Application October 27, 1951, Serial No. 253,552

8 Claims. (Cl. 252—135)

The present invention relates to a process for the production of sodium polyphosphates, having a great immediate solubility in water.

It is known that pyrophosphates, metaphosphates and polyphosphates are produced by dehydrating orthophosphates which have been incompletely neutralized. The preparation of pyro- and metaphosphates differs from that of polyphosphates in that individual chemical compounds are used for preparing the former, while the latter are made from a starting material consisting in a mixture of mono- and dialkali phosphates. In order to make sure that a mixture of these salts reacts completely down to the smallest particles one has already used a starting material, containing monosodium phosphate and disodium phosphate in a very fine mixed state and having been prepared by flash-drying finely divided solutions containing both $NaH_2PO_4$ and $Na_2HPO_4$. The polyphosphates prepared in this way are said to be very easily soluble in water.

It is the object of this invention to provide a simple and inexpensive process for the production of a solid material containing sodium polyphosphates of higher immediate water solubility than that of products of this kind known heretofore. Other objects and advantages of the process according to the invention will become apparent from the following specification.

It has been pointed out that, in the production of sodium polyphosphates, it is very important to use pure starting materials. If impurities should be present, they should be such as to be volatilized away and not deposited in the residual solid salt mass. Therefore it was very surprising, that sodium polyphosphates, having a content of sodium sulfate from 10–30% by weight and being prepared from solutions, containing sodium sulfate, have still a greater immediate solubility than sodium polyphosphates, being prepared from pure starting materials.

According to this invention, solutions containing mono- and disodium phosphate and sodium sulfate in amounts sufficient to reach a content of 10–30% by weight in the final product, is flash dried; the dry powder obtained in this way is then heated in any suitable apparatus to volatilize away molecularly bound water and to produce sodium polyphosphate.

Solutions containing mono- and disodium phosphates may be obtained in any desired way. They may, for instance, be produced by reacting pure phosphoric acid or phosphoric acid containing impurities with caustic alkalies or alkali carbonates; they may, furthermore, be obtained from acid phosphate solutions, such as they result from the reaction of superphosphates with sodium sulfate solutions. It is possible too, to add sulfuric acid or sodium sulfate to any solution of orthophosphates to reach the desired content of 10–30% by weight sodium sulfate in the final product. The ratio of mono- and disodium phosphate is so adjusted as to correspond to the desired ratio of alkalioxide and phosphorous pentoxide in the produced polyphosphate. If the phosphate solution is prepared by reacting superphosphate with a sodium sulfate solution, a surplus of the latter may be used to introduce the desired quantity of sodium sulfate.

These solutions are processed thereafter by the usual operations known in the art. The dry mixtures are obtained from the lyes by flash-drying, for instance, by spray-drying or by drying on a roller. More particularly, in the spray-drying the hot gases escaping from the polyphosphate furnace can be used for drying the phosphate solution. In the thus obtained dry products, mono- and diphosphates are intimately mixed down to molecular dimensions. For dehydrating, the thus obtained products are heated to the required temperatures, if necessary, with addition of substances which accelerate the reaction. The reaction can be brought about either by calcining or by fusing. In order to shorten the time of reaction, temperatures over 270° C. are applied. It is obvious that the kind of processing the dehydrating step and of cooling the hot sodium polyphosphates has a certain influence on the solubility of the final product, but in each case, sodium polyphosphates with a content of 10–30% by weight sodium sulfate and being prepared by the process of this invention have a better solubility than sodium polyphosphates containing no or little amounts of sodium sulfate only.

It was found that the sulfate contents of the dry starting products impairs neither the dehydration process nor their calcium sequestering properties. As sodium polyphosphates are mostly used as cleaning agents for industrial and household use, their content of sodium sulfate is no disadvantage, because such compositions often contain sodium sulfate as builders.

In the following, the process according to the invention will be described more fully and illustrated by examples. However, it should be understood that these examples are given by way of illustration only and that many modifications of the amount of the components and other par-

Example 1

16.6 cu. meters of an aqueous solution containing 50 grams of $Na_2SO_4$ and 296 grams of $NaH_2PO_4$ per liter are neutralized with 1.4 tons soda to a point where the solution contains $NaH_2PO_4$ and $Na_2HPO_4$ in a molar ratio of 1:1.0. This mixed phosphate solution is concentrated by heating to a $P_2O_5$-content of 298 g./l. and after addition of 50 kg. of $NaNO_3$, which serve for the oxidation of dark impurities in the subsequent dehydrating step, sprayed at a temperature of 110° C. 6.4 t. of dry powder are obtained of the following composition: 57.5% $Na_2HPO_4$, 27.1% $NaH_2PO_4$, 12.1% $Na_2SO_4$, 0.5% water insoluble substances, 2.8% moisture and impurities.

The material coming from the spraying tower was passed through a gas-heated revolving furnace at a temperature from 300–500° C. The calcination product (5.8 t.) is a white, granular powder which is readily soluble and has the following composition: 80.7% $Na_5P_3O_{10}$, 5.2% $(NaPO_3)_3$, 12.7% $Na_2SO_4$, 0.2% water-insoluble components, 1.2% moisture. The thus obtained polyphosphate has a high capacity for sequestering calcium-ions.

Example 2

2.1 t. of $Na_2HPO_4$ are added to 10 cu. meters of a monophosphate lye containing 175 g./l. $NaH_2PO_4$ and 65 g./l. sodium sulfate, and which was partly neutralized with 0.35 t. of $Na_2CO_3$ and filtered. The mixture is further treated as in Example 1, i. e. concentrated, sprayed and calcined. About 5 t. of the calcined product are obtained containing 88% $Na_5P_3O_{10}$ and 12% $Na_2SO_4$ and having the same properties as described in Example 1.

To show the better immediate solubility of the product obtained by the process described in Example 2, its solubility was compared with that of a product, being made from starting material containing no sodium sulfate. The conditions of processing were the same as described in Example 2. The sulfate free product contained particles, the size of that being a little greater than the particle size of the sulfate containing product. To show that the difference in the immediate solubilities was not due to the difference in the particle sizes, the sulfate-free product was milled in a laboratory mill. The distribution of particle sizes was as follows:

| | particle size in mm. | | | | |
|---|---|---|---|---|---|
| | 0.3 | 0.3–0.2 | 0.2–0.09 | 0.09–0.06 | 0.06 |
| sodium polyphosphate, 12% $Na_2SO_4$ | Percent 26 | Percent 22 | Percent 40 | Percent 7 | Percent 5 |
| sodium polyphosphate without $Na_2SO_4$ | 40 | 26.5 | 23 | 8 | 8.5 |
| sodium polyphosphate without $Na_2SO_4$, milled | 3.5 | 26.5 | 36 | 14 | 20 |

To determine the immediate solubility of these polyphosphates, samples of 10 g. were shaken for 2, 5, 10 and 30 seconds with 90 cm.³ of distilled water. The solids were then filtered off, dried and weighted. The dissolved polyphosphate given in per cent of the used polyphosphate, was as follows:

| | dissolved product after seconds of shaking | | | |
|---|---|---|---|---|
| | 2 | 5 | 10 | 30 |
| sodium polyphosphate, 12% $Na_2SO_4$ | Percent 96.5 | Percent 97.1 | Percent 97.3 | Percent 99.7 |
| sodium polyphosphate without $Na_2SO_4$ | 50 | 64 | 75 | 89 |
| sodium polyphosphate without $Na_2SO_4$, milled | 59 | 75 | 79 | 89 |

Example 3

To 15 cu. meters of a technical phosphate lye, which contains 175 g. $P_2O_5$ per liter in the form of $NaH_2PO_4$, 467 g. $Na_2SO_4$ per liter and Al-, Fe- and ca-ions as impurities, 785 kgs. of calcined soda are added. The solution is filtered to remove the precipitated impurities and now contains 40% of the $P_2O_5$ neutralized to $Na_2HPO_4$. By evaporation on a spraying roller a dry salt is obtained in powder form which is subsequently heated in a calciner to 450° C.

4.65 t. of a product are obtained containing 15% $Na_2SO_4$, 53% of $P_2O_5$ and 32% $Na_2O$. This composition corresponds to a molar ratio of $7Na_2O:5P_2O_5$. In view of the excellent calcium-sequestering property, it may be assumed that a mixture of 1 mol $Na_5P_3O_{10}$ and 2 mol of polymer $NaPO_3$ is present.

Example 4

10 cu. meters of Na-diphosphate lye, which contains 2.4 t. $Na_2HPO_4$ and 0.85 $Na_2SO_4$ are mixed with 0.7 t. $H_3PO_4$ (of 78.7%) and sprayed while warm. The spray-dried powder yields, after calcining in a revolving furnace at 350–400° C. about 3.4 t. of a product with 24% $Na_2SO_4$, 44.5% $P_2O_5$ and 29.5% $Na_2O$. This composition corresponds to a content of 98% hexasodium tetrapolyphosphate $(Na_6P_4O_{13})$. The product has a very good immediate solubility in water.

Example 5

To 10 cu. meters of sodium diphosphate lye with 2.4 t. of $Na_2HPO_4$, we add 454 kg. sulfuric acid (60° Bé.=78% $H_2SO_4$) and this solution is concentrated to about 60% of solid contents and subsequently sprayed while heated. By calcining the spray-dried powder in a sintering furnace or other suitable calcining furnace we obtain at a temperature of about 350–450° C., an almost water-free product containing 80% $Na_5P_3O_{10}$, 3% polymer $NaPO_3$, 15% $Na_2SO_4$. The sequestering capacity for calcium is excellent, which makes it possible to use the product in cleansing and rinsing compounds.

Example 6

920 kg. $Na_2HPO_4$ are dissolved in 1.5 cu. meters of hot water and—after adding 200 kg. sulfuric acid of 78% $H_2SO_4$—sprayed at a temperature of 105° C. By sintering the spray-dried powder in a calciner at 400–450° C., there is obtained 950 kg. of a mixture, containing about 75% $Na_6P_4O_{13}$ and 23% $Na_2SO_4$. The product has a high calcium sequestering capacity and can be used in washing agents.

*Example 7*

2 cu. meters of a hot solution containing 920 kg. $Na_2HPO_4$ and 163 kg. $NaH_2PO_4$ were hot sprayed after addition of 400 kg. $Na_2SO_4$. The sprayed powder was sintered in a calcinator at a temperature of 350–400° C. There were obtained 1.4 t. of a dry powder containing 38% $Na_4P_2O_7$, 32% $Na_5P_3O_{10}$ and 28% $Na_2SO_4$. The product has a good sequestering capacity for calcium ions, a high immediate solubility in water and is therefore suitable for the use in all kinds of washing, rinsing and cleaning compositions.

*Example 8*

10 cu. meters of a phosphate lye containing 1000 kg. $NaH_2PO_4$, 1200 kg. $Na_2HPO_4$ and 600 kg. $Na_2SO_4$ and being prepared by addition of sulphuric acid to a solution of disodium phosphate were sprayed into a revolving furnace. The furnace was heated by a direct flame. In the furnace the solution was dried and the solid particles molten down at 800° C. under completely dehydrating. After chilling the molten product there was obtained a material that could easily be milled into a fine powder being very good soluble in water. The mixture contained 21.1% $Na_2SO_4$, 26.1% $P_2O_5$ and 31.3% $Na_2O$. The molar ratio $Na_2O:P_2O_5$ corresponds to the formular $Na_6P_4O_{13}$. The product has a very good calcium sequestering property.

We claim:

1. A process for producing a material containing sodium polyphosphates which comprises making a solution containing a mixture of monosodium phosphate, disodium phosphate and sodium sulfate in an amount sufficient to give a content of 10–30% by weight of sodium sulfate in the final product, flash-drying the solution so as to obtain a mixture of said phosphates and the sulfate in powder form, and heating said powder to a temperature over 270° C., at which conversion of the phosphates into polyphosphates will occur.

2. A process for producing a material containing sodium polyphosphates which comprises making a solution containing a mixture of monosodium phosphate, disodium phosphate and sodium sulfate in an amount sufficient to give a content of 10–30% by weight of sodium sulfate in the final product, concentrating said solution, flash-drying the concentrate so as to obtain a mixture of said phosphates and the sulfate in powder form, and heating said powder to a temperature over 270° C. at which conversion of the sodium phosphates into sodium polyphosphates will occur.

3. A process for producing a material containing sodium polyphosphates which comprises making a solution containing a mixture of monosodium phosphate, disodium phosphate and sodium sulfate in an amount sufficient to give a content of 10–30% by weight of sodium sulfate in the final product, concentrating said solution, flash-drying the concentrate at a temperature above 100° C. until a dry powder is obtained, and heating said powder at a temperature ranging from 270° C. to 850° C., whereby conversion of the phosphates into polyphosphates occurs.

4. A process according to claim 3 in which conversion of the mixture of phosphates into polyphosphates is brought about by calcining in the temperature range from 270–500° C.

5. A process according to claim 3, wherein conversion of the mixture of phosphates into polyphosphates is brought about by heating to fusion in the temperature range from 650–800° C.

6. A process according to claim 1, wherein the flash-drying is effected by spray-drying.

7. A process according to claim 1, wherein the flash-drying is effected by spraying the solution to be dried into the hot furnace for dehydrating the orthophosphates.

8. A process according to claim 1, wherein the flash-drying is effected by a hot roller.

BRUNO BLASER.
FRIEDRICH WELDES.

References Cited in the file of this patent

FOREIGN PATENTS

| Number | Country | Date |
|---|---|---|
| 378,345 | Great Britain | Aug. 11, 1932 |